(12) United States Patent
Hecht (10) Patent No.: US 8,747,031 B2
(45) Date of Patent: Jun. 10, 2014

(54) CUTTING INSERT AND CUTTING INSERT ASSEMBLY

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 1009 days.

(21) Appl. No.: 12/765,604

(22) Filed: Apr. 22, 2010

(65) Prior Publication Data

US 2010/0272522 A1  Oct. 28, 2010

(30) Foreign Application Priority Data

Apr. 26, 2009 (IL) .......................................... 198376

(51) Int. Cl.
*B23B 27/16* (2006.01)

(52) U.S. Cl.
CPC ..................................... *B23B 27/16* (2013.01)
USPC ........................................................ 407/103

(58) Field of Classification Search
USPC .............................. 407/47, 48, 103, 104, 106
IPC ....................................................... B23B 27/16
See application file for complete search history.

(56) References Cited

U.S. PATENT DOCUMENTS

| 3,654,682 | A | * | 4/1972 | Newbould ..................... 407/104 |
| 3,740,807 | A | * | 6/1973 | Getts ............................. 407/104 |
| 3,913,197 | A | * | 10/1975 | Wolf ............................... 407/47 |
| 4,283,163 | A | * | 8/1981 | Grafe et al. ................... 407/104 |
| 4,397,592 | A | | 8/1983 | Erickson |
| 5,039,259 | A | | 8/1991 | Duncan |
| 5,199,828 | A | * | 4/1993 | Forsberg et al. .............. 407/104 |
| 6,155,754 | A | | 12/2000 | Jönsson |
| 7,677,842 | B2 | * | 3/2010 | Park .............................. 407/113 |
| 7,726,218 | B2 | | 6/2010 | Furuki |
| 7,959,383 | B2 | * | 6/2011 | Choi et al. .................... 407/105 |
| 2004/0223818 | A1 | | 11/2004 | Sheffler et al. |
| 2007/0286692 | A1 | | 12/2007 | Rysavy |
| 2008/0240873 | A1 | * | 10/2008 | Furuki .......................... 407/107 |

FOREIGN PATENT DOCUMENTS

| CN | 101189096 A | 5/2008 |
| JP | H02-135115 U | 11/1990 |
| JP | 2003 165004 | 6/2003 |

(Continued)

OTHER PUBLICATIONS

International Search Report in PCT/IL2010/000263, dated Aug. 19, 2010.

(Continued)

*Primary Examiner* — Andrea Wellington
*Assistant Examiner* — Alan Snyder
(74) *Attorney, Agent, or Firm* — Womble Carlyle (57) ABSTRACT

A cutting insert assembly having an insert pocket having a pocket bore, a cutting insert and a fastening member coupling the cutting insert in the insert pocket. The cutting insert having a cutting insert bore, a first surface, a second surface and a peripheral surface extending therebetween. The first and second surfaces meeting the peripheral surface at first and second peripheral edges, respectively, at least a portion of at least one of the first and second peripheral edges forming a cutting edge. The cutting insert bore having at least two portions, the smallest of which, has an oval cross section allowing a for quick replacing or indexing of the cutting insert, without having to completely remove the fastening member from the pocket bore.

16 Claims, 11 Drawing Sheets

(56) References Cited

FOREIGN PATENT DOCUMENTS

| JP | 2004 167635 | 6/2004 |
| JP | 2004-261937 | 9/2004 |
| JP | 2006-263856 | 10/2006 |
| JP | 2006263856 A * | 10/2006 |
| SU | 1 255 287 | 9/1986 |
| WO | WO 2008132757 A1 * | 11/2008 |

OTHER PUBLICATIONS

Office Action dated Mar. 1, 2013 issued in Chinese counterpart applicaton (No. 201080018247.6).

Office Action dated Mar. 1, 2013 issued in Chinese counterpart applicaton (No. 201080018247.6) English Translation.

Office action dated Jan. 28, 2014 issued in Japanese counterpart application (No. 2012-506642).

* cited by examiner

CUTTING INSERT AND CUTTING INSERT ASSEMBLY

FIELD OF THE INVENTION

The present invention relates to the field of cutting tools, for example metal cutting tools, having cutting inserts detachably secured thereto by means of a fastener such as a screw having a screw head. More specifically, it relates to a cutting insert and the assembly and method of replacement or indexing of the cutting insert without necessitating removal of the fastener.

BACKGROUND OF THE INVENTION

U.S. Pat. No. 6,155,754 relates to a fastening arrangement in a cutting tool, having a standard cutting insert and a special locking screw, the screw head having two opposite, vertical chamfers. In this arrangement, the cutting insert can be removed without completely unscrewing the locking screw from a threaded hole in the cutting insert seat.

A drawback with this arrangement is that the screw head is not symmetrical and consequently the screw thread and the bore thread have to be designed accurately enough to ensure that after the screw is fastened, the screw head abutment surfaces are correctly oriented in order to abut and secure the cutting insert in its seat.

Another drawback is the weakening of the screw head as a result of the removal of material due to the chamfering. Consequently, less torque can be applied to the screw head than in comparison with a non-chamfered screw head. This may lead to unpredicted, unwanted effects such as inaccuracies in locating the cutting insert, or a sudden release of the insert.

U.S. Pat. No. 4,397,592 describes a fastening arrangement for cutting inserts having a standard cutting insert and a locking pin, asymmetrically clamping the cutting insert. This arrangement allows indexing of the cutting insert by only loosening the locking pin, lifting it until its cylindrical portion is out of its corresponding portion in the receiving hole and tilting the locking pin until it is possible to slide the cutting insert coaxially over the clamping head.

A certain drawback of this arrangement is the small and asymmetric abutment area between the locking pin clamping head and the locking face of the insert aperture. This asymmetry leads to asymmetric force distribution in the cutting insert, in comparison to the symmetric abutment. This may lead to locating inaccuracies, shortened life of the cutting insert or breaks in the cutting edges.

SUMMARY OF THE INVENTION

According to embodiments of the present invention there is provided a cutting insert and a cutting insert assembly located in a cutting portion of a cutting tool.

In accordance with a first embodiment the cutting insert comprises:
a first surface, a second surface and a peripheral surface extending therebetween, the first and second surfaces meeting the peripheral surface at first and second peripheral edges, respectively, at least a portion of at least one of the first and second peripheral edges forming a cutting edge, and
a cutting insert bore extending between the first and second surfaces and having a bore axis B, the cutting insert bore comprising:
a first bore portion opening out to the first surface, a second bore portion opening out to the second surface and a third bore portion located between and merging with the first and second bore portions, respectively, the third bore portion including a bore plane P which is perpendicular to the bore axis B and in which the cutting insert bore has a non-circular cross-section. The third bore portion may have a major centerline M perpendicular to the bore axis B and a minor centerline N perpendicular to the bore axis B defining, respectively, major and minor dimensions $D_M$, $D_N$ of a cross section of the third bore portion taken perpendicular to the bore axis B, wherein the cross section has an oval shape.

In accordance with a second embodiment of the present invention, the cutting insert is reflection symmetric with respect to a bore plane P defined by the major and minor centerlines M and N respectively.

In accordance with embodiments of the present invention, the cutting insert bore is reflection symmetric with respect to a bore plane P defined by the major and minor centerlines M and N respectively.

In accordance with a third embodiment of the present invention, the cutting insert comprises:
a first surface, a second surface and a peripheral surface extending therebetween, the first and second surfaces meeting the peripheral surface at first and second peripheral edges, respectively, at least a portion of at least one of the first and second peripheral edges forming a cutting edge, and
a cutting insert bore extending between the first and second surfaces and having a bore axis B, the cutting insert bore comprising:
a first bore portion opening out to the first surface and a second bore portion opening out to the second surface, the second bore portion including a bore plane P which is perpendicular to the bore axis B and in which the cutting insert bore has a non-circular cross-section. The second bore portion may have a major centerline M perpendicular to the bore axis B and a minor centerline N perpendicular to the bore axis B defining, respectively, major and minor dimensions $D_M$, $D_N$ of a cross section of the second bore portion taken perpendicular to the bore axis B, wherein the cross section has an oval shape.

In accordance with a fourth embodiment of the present invention, the cutting insert bore has a cylindrical first bore portion and a cylindrical second bore portion.

In accordance with the present invention there is also provided a cutting insert assembly comprising:
an insert pocket having a pocket base including a pocket bore;
a fastening member having a fastening member head and a fastening member coupling portion received in the pocket bore; and
a cutting insert, being transferable between an insert fastened position in which a fastening member head lower portion is in engagement with the first bore abutment surfaces to an insert removal position, wherein
in the insert fastened position, in a top view of the cutting insert, the fastening member head has a contour that is too large to pass through the cutting insert bore, and
in the insert removal position, in a top view of the cutting insert, the contour of the fastening member head is small enough to pass through the cutting insert bore.

In accordance with embodiments of the present invention, the fastening member coupling portion has a diameter which is equal to the diameter of the fastening member head.

In accordance with embodiments of the present invention, the fastening member head has a first recess and the coupling portion has a second recess which has the same dimensions as the first recess.

In accordance with the present invention there is further provided a method for replacing or indexing the cutting insert, secured by a fastening member in an insert pocket of a cutting insert assembly of a cutting tool, the insert pocket having a pocket bore and a pocket base, the fastening member having a fastening member head and a fastening member coupling portion;

the method comprising the steps of:
a) partially removing the fastening member from the pocket bore so that the fastening member coupling portion remains coupled to the pocket bore in a partially coupled position;
b) lifting the cutting insert from the pocket base to a lifted position;
c) rotating the cutting insert about the major centerline M from a starting rotated position, and moving it perpendicularly to the major centerline M to an insert removal position in which, in a top view of the cutting insert, the contour of the fastening member head defines a shape that is small enough to pass through the cutting insert bore; and
d) removing the cutting insert by lifting it off the fastening member head.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
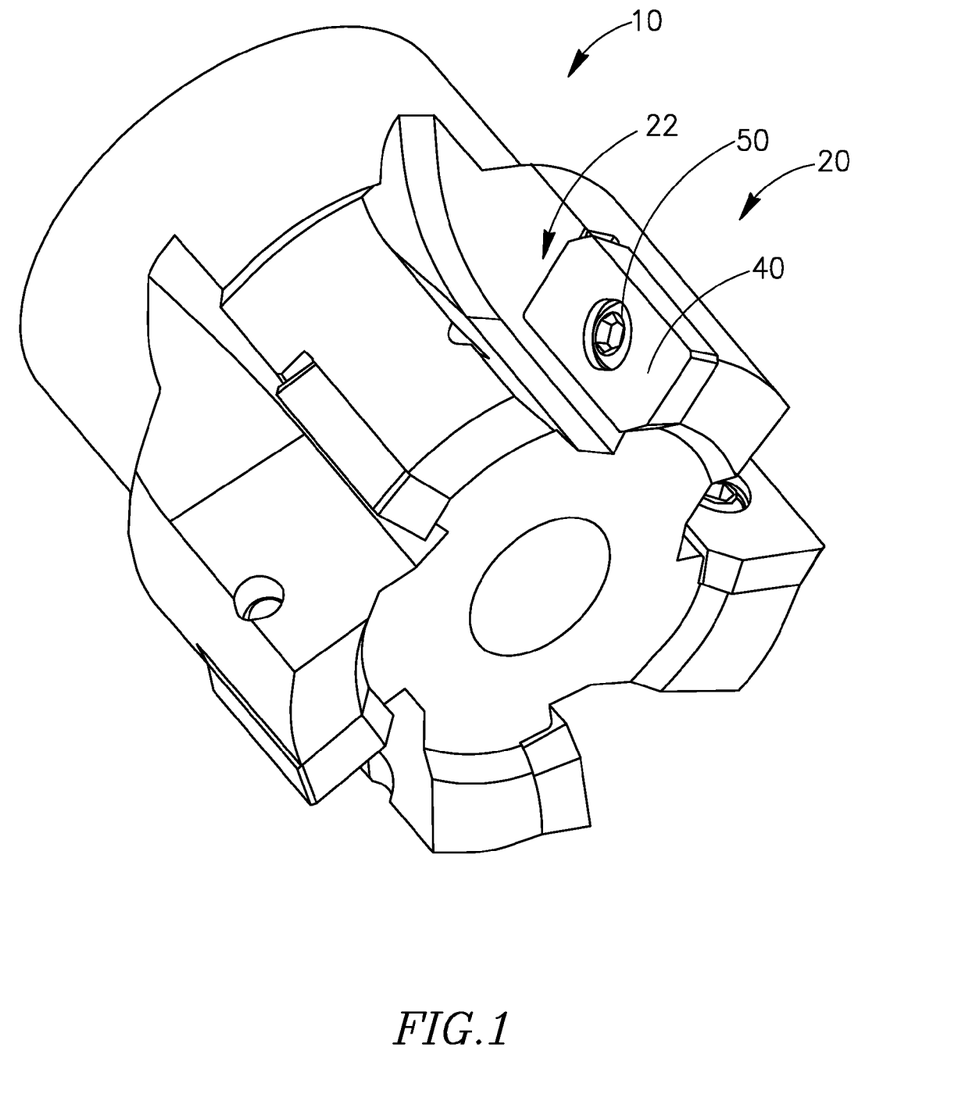
FIG. 1 is an isometric view of a cutting tool according to a first embodiment of the present invention.

Reference is made to the figures in general and specifically to FIG. 1, showing according to embodiments of the present invention, an isometric view of a cutting tool 10 having five cutting portions 20. Each cutting portion 20 has a cutting insert assembly 22 which includes an insert pocket 30 with a cutting insert 40 releasably secured therein by a fastening member 50. The number of cutting portions 20 is not limited to five and the shape of the cutting insert 40 is not limited to any particular shape.

Figure 2:
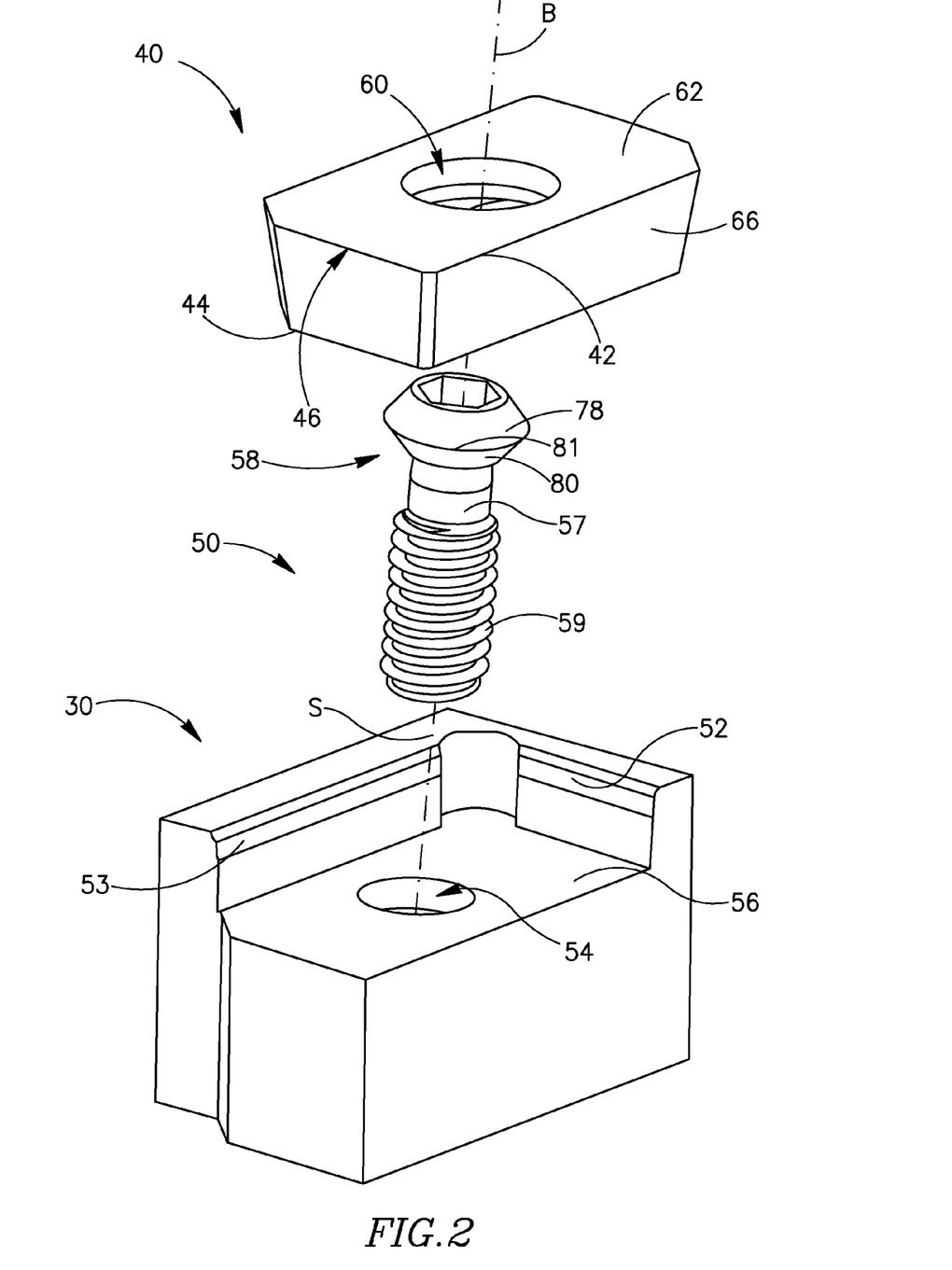
FIG. 2 is an exploded view of a cutting portion of the cutting tool shown in FIG. 1.

Reference is now made to FIG. 2 showing an exploded view of the cutting insert assembly 22. The insert pocket 30 has adjacent first and second abutment walls 52, 53, a pocket bore 54 in a pocket base 56 from which the first and second abutment walls 52, 53 extend. In accordance with some embodiments, the pocket bore 54 may be threaded. The cutting insert 40 has a cutting insert bore 60, a first surface 62, an opposing second surface 64 and a peripheral surface 66 extending therebetween. The cutting insert bore 60 extends between the first and second surfaces 62, 64. The first and second surfaces 62, 64 meet the peripheral surface 66 at first and second peripheral edges 42, 44, respectively, at least a portion of at least one of the first and second peripheral edges 42, 44 forming a cutting edge 46. Portions of the peripheral surface 66 may abut one or both of the first and second abutment walls 52, 53.

Figure 3:
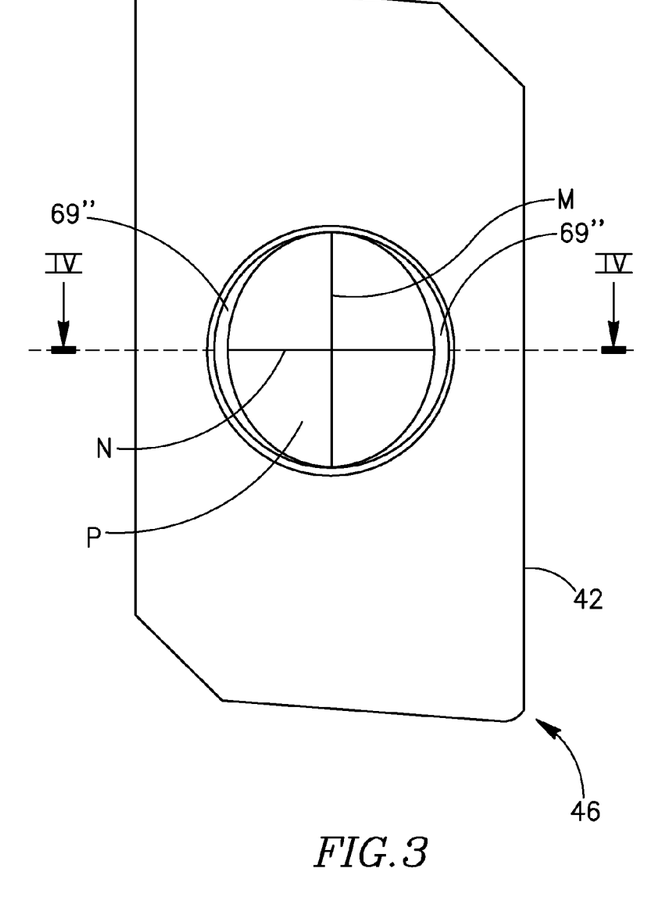
FIG. 3 is a top view of a cutting insert in accordance with embodiments of the present invention.
Figure 4:
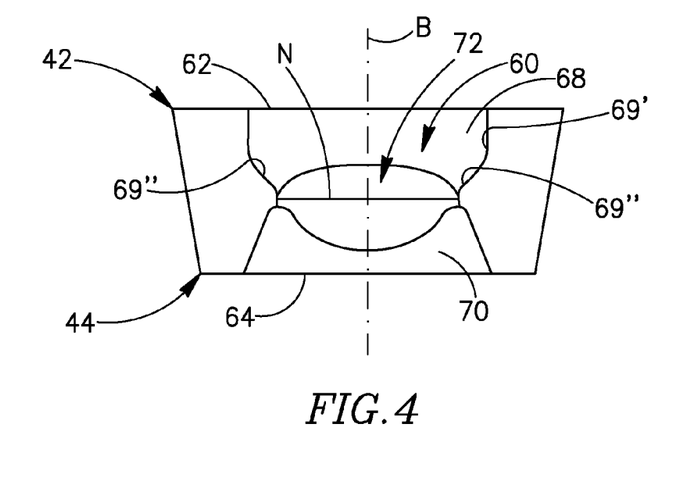
FIG. 4 is a cross-sectional view taken along line IV-IV of FIG. 3.
Figure 5:
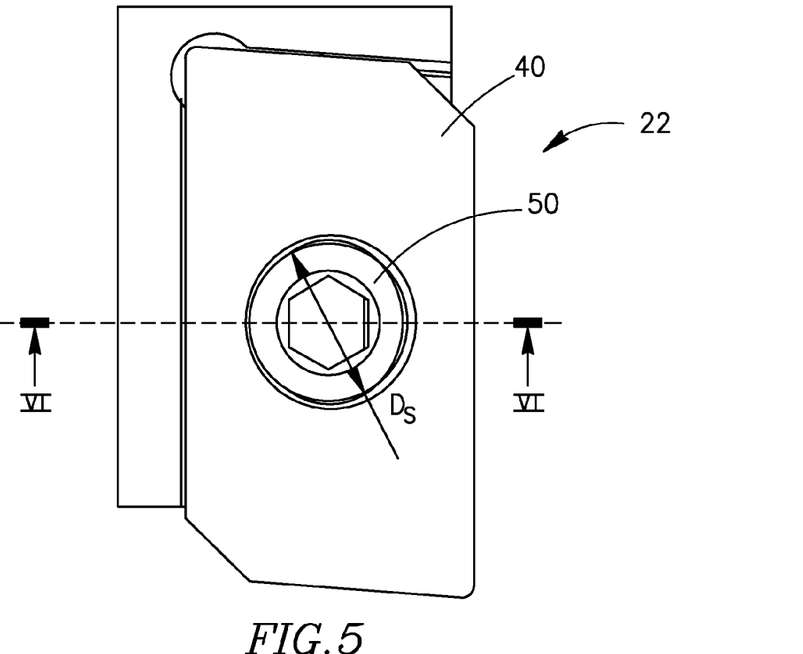
FIG. 5 is a top view of a cutting portion shown in FIG. 1 with the cutting insert in an insert fastened position in the insert pocket.

Attention is now drawn to FIGS. 3 and 4. The cutting insert bore 60 has a first bore portion 68, a second bore portion 70, and a third bore portion 72, or intermediate bore portion, located between the first and second bore portions 68, 70. The first and second bore portions 68, 70 connecting with the third bore portion 72. The first bore portion 68 has a first bore non-abutment surface 69' adjacent the first surface 62 and first bore abutment surfaces 69" extending inwardly and downwardly from the first bore non-abutment surface 69' towards the second surface 64. The third bore portion 72 includes a bore plane P which is perpendicular to the bore axis B and in which the bore 60 has a non-circular cross-section. In some embodiments, the bore plane P is defined by a major centerline M perpendicular to the bore axis B and a minor centerline N perpendicular to the bore axis B. The major and minor centerlines M, N are perpendicular to each other and define, respectively, major and minor bore dimensions $D_M$, $D_N$ of a cross section of the third bore portion 72 taken perpendicular to the bore axis B. The first bore abutment surfaces 69" are symmetrical with respect to the major centerline M, this symmetry is important to ensure that unwanted effects, such as torque applied to the body of the cutting insert 40, do not occur.

The non-circular cross section of the third bore portion 72 may be located in the bore plane P and in accordance with some embodiments may have an oval shape. The cross sections of the first and second bore portions 68, 70, taken perpendicular to the bore axis B, do not have an oval shape. In accordance with some embodiments of the present invention the word oval is taken to mean a figure formed by a closed, curved line having a convex shape with two perpendicular axes that cross at a center of the figure. The figure is wider along one of the axes than along the other and diminishes in width while moving outwards from the center, along each of the two axes. In accordance with some embodiments, the oval cross section of the third bore portion 72 may be elliptical in shape. The cross section of the third bore portion 72 taken perpendicular to the bore axis B is smaller than any other cross section of the cutting insert bore 60 taken perpendicular to the bore axis B.

Attention is now drawn in addition to FIGS. 5 to 8. The cutting insert 40 is secured in the insert pocket 30 by the fastening member 50. The fastening member 50 has a fastening member head 58, a fastening member neck 57, a fastening member coupling portion 59 which may have male screw thread or any other suitable coupling means, and a fastening member axis S defining an upward to downward direction. The fastening member neck 57 connects between the fastening member coupling portion 59 and the fastening member head 58. The fastening member head 58 has a peripheral surface 79 and a fastening member head diameter $D_S$ wherein $D_N < D_S < D_M$. The fastening member head 58 has a fastening member head upper portion 78 and a fastening member head lower portion 80 located on the fastening member head peripheral surface 79. In accordance with some embodiments, the fastening member head 58 is rotationally symmetric about the fastening member axis S so that in a view along the fastening member axis S the fastening member head 58 has a circular contour. In accordance with some embodiments, the fastening member head upper and lower portions 78, 80 extend from a mutual join 81. In accordance with some embodiments, the join 81 is the widest portion of the fastening member head 58 so that in a view along the fastening member axis S the circular contour of the fastening member head 58 is the contour of the join 81.

Figure 6:
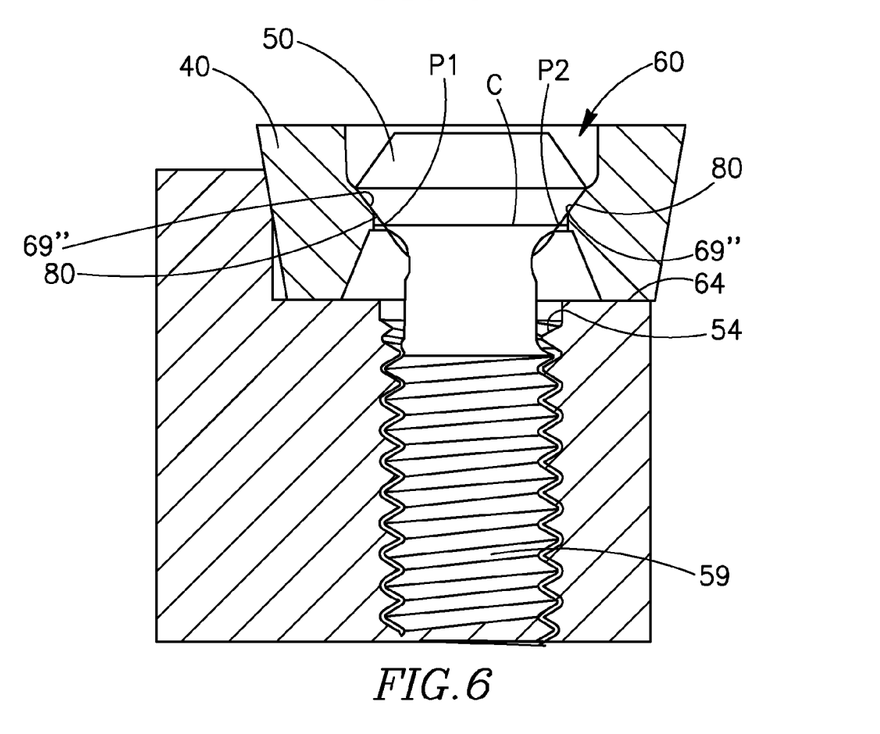
FIG. 6 is a cross-sectional view taken along line VI-VI of FIG. 5.
Figure 7:
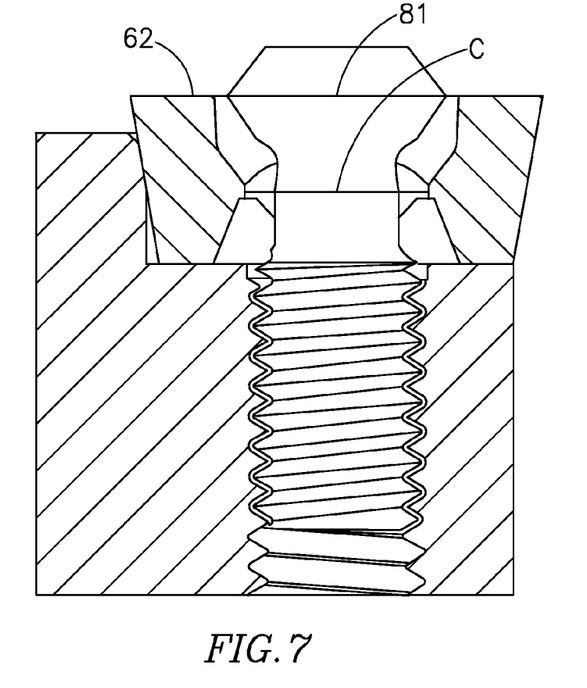
FIG. 7 is a cross-sectional view similar to that shown in FIG. 6 showing the fastening member lifted.
Figure 8:
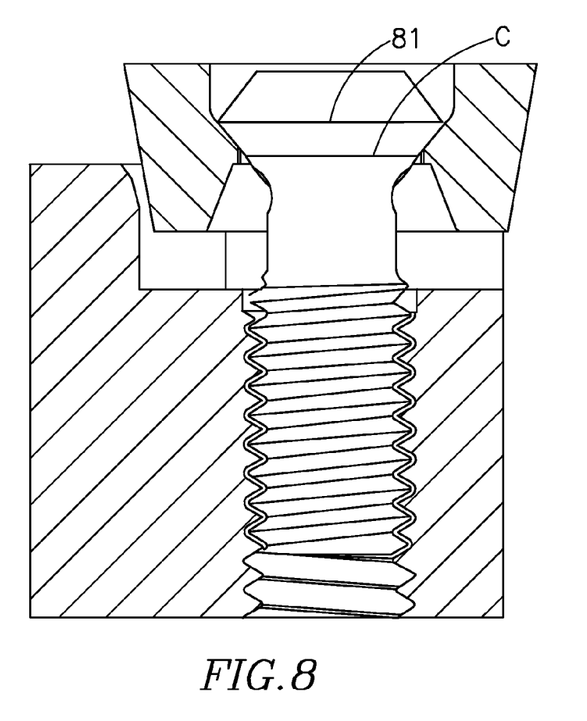
FIG. 8 is a cross-sectional view similar to that shown in FIG. 7 showing the cutting insert in a lifted position.

As seen in FIG. 6, when the cutting insert 40 is secured in the insert pocket 30, that is, in an insert fastened position, the fastening member head 58 is located in the cutting insert bore 60 with the fastening member head lower portion 80 in engagement with the first bore abutment surfaces 69". In this position, a large abutment area is formed between the fastening member lower portion 80 and the first bore abutment surfaces 69", therefore when the fastening member is tightened, large coupling forces are generated mainly downwards, towards the pocket base 56. The fastening member coupling portion 59 is received in the pocket bore 54 where it is coupled thereto in a fully coupled position. In accordance with some embodiments the fastening member coupling portion 59 may have a male screw thread and the pocket bore 54 may have a female screw thread and the fastening member coupling portion 59 may be threadingly received in the pocket bore 54. As can be seen from FIG. 5, and understood from FIG. 6, when the cutting insert 40 is secured in the insert pocket 30, that is in an insert fastened position, in a top view of the cutting insert 40, the fastening member head 58 has a contour that is too large to pass through the cutting insert bore 60, thereby not allowing the fastening member head 58 to pass through the cutting insert bore 60.

For the fastening member 50 an intermediate centerline C is defined by the intersection of the minor centerline N with the fastening member 50. The intermediate centerline C has two intersection end points P1 and P2 (as shown in FIG. 6 and FIGS. 8-12). The intermediate centerline C has an intermediate centerline dimension $D_C$ which is always less than the minor bore dimensions $D_N$. Since the intermediate centerline C is defined by the intersection of the minor centerline N with the fastening member head 58, it is located on the minor centerline N. Although in FIGS. 10 and 11 it may appear that the intermediate centerline C and the minor centerline N are coextensive, this is not the case and only seems to be the case because in the position shown in FIGS. 10 and 11 the resolution of the lines in the drawing is not great enough to show that the intermediate centerline C is slightly shorter than the minor centerline N in the position shown in FIG. 6.

Figure 9:
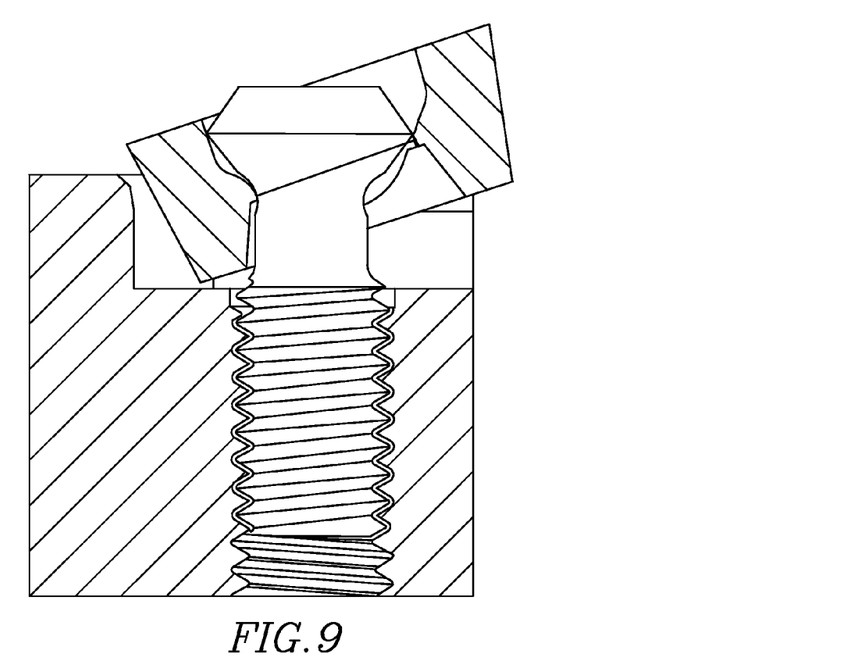
FIG. 9 is a cross-sectional view similar to that shown in FIG. 8 showing the cutting insert in a starting rotated position.
Figure 10:
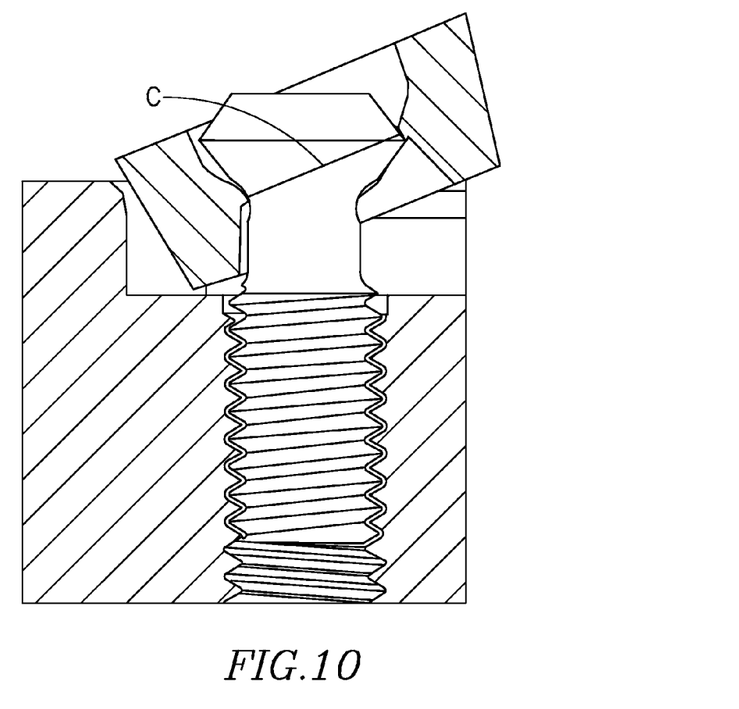
FIG. 10 is a cross-sectional view similar to that shown in FIG. 6 showing the cutting insert in an intermediate rotated position.
Figure 11:
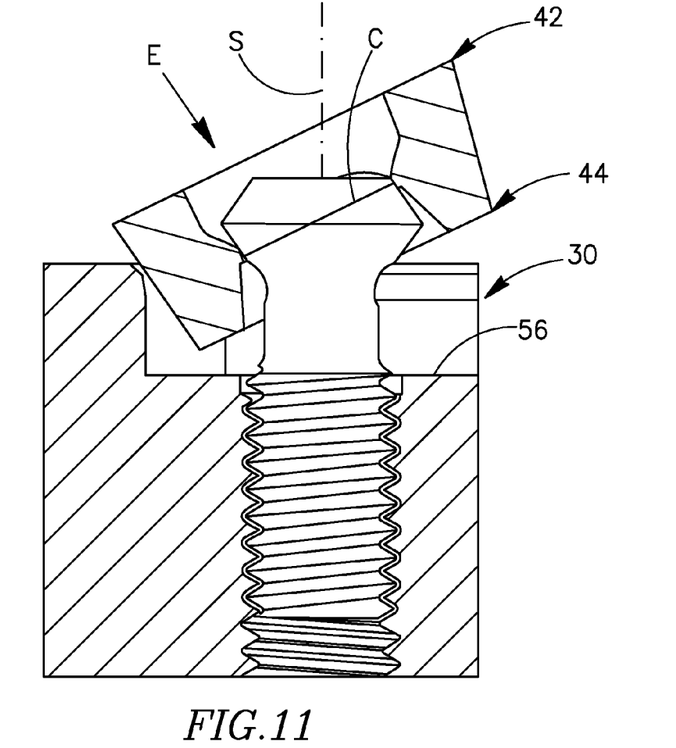
FIG. 11 is a cross-sectional view taken along line XI-XI of FIG. 12, or equivalently it is a cross-sectional view similar to that shown in FIG. 5 showing the cutting insert in an insert removal position allowing a head of the fastening member to pass through the cutting insert bore.
Figure 12:
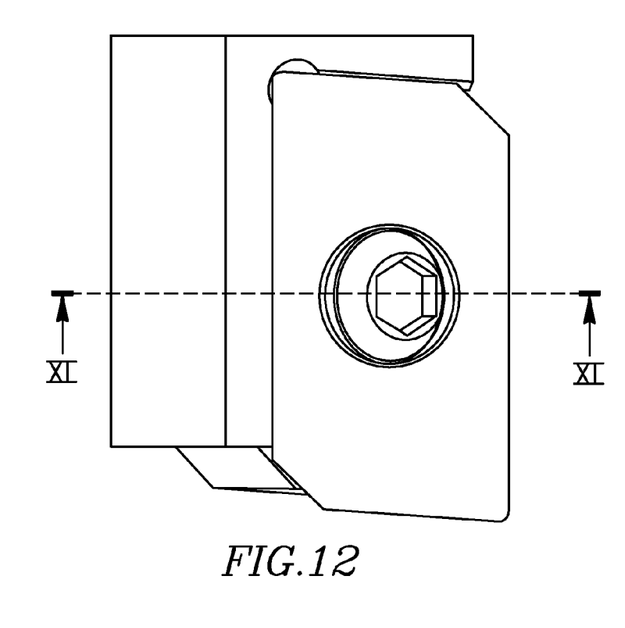
FIG. 12 is a view of the cutting portion of the cutting tool shown in FIG. 1 taken in a top view of the cutting insert indicated by the direction E in FIG. 11.

In order to replace or index the cutting insert 40, it is not necessary, as will be shown below, to remove the fastening member 50 completely from the pocket bore 54. In order to replace or index the cutting insert 40 it is sufficient to partially remove the fastening member 50 from the pocket bore 54 so that the fastening member coupling portion 59 remains coupled to the pocket bore 54 in a partially coupled position (see FIG. 7-11). When the fastening member coupling portion 59 is in the partially coupled position, the fastening member head 58 is further removed from the pocket base 56 than when the fastening member coupling portion 59 is in the fully coupled position (as shown in FIG. 6). When the fastening member coupling portion 59 is in the partially coupled position, the cutting insert 40 may be lifted from the pocket base 56 to a lifted position (see FIG. 8). With the cutting insert 40 in the lifted position it can be rotated about the major centerline M from a starting rotated position, as shown in FIG. 9, while at the same time, moving it perpendicularly to the major centerline M to an intermediate rotated position as shown in FIG. 10, until it reaches an insert removal position (see FIG. 11), in which in a top view of the cutting insert 40 the contour of the fastening member head 58 is small enough to pass through the cutting insert bore 60, as shown in FIG. 12, thereby allowing the fastening member head 58 to pass through the cutting insert bore 60. In the insert removal position the cutting insert 40 may be removed from the insert pocket 30 by lifting it off the fastening member head 58. In order to install a replacement cutting insert while the fastening member coupling portion 59 is clamped in the pocket bore 54, a reverse sequence of the abovementioned actions is carried out.

The variation of the intermediate centerline dimension $D_C$, during the above mentioned rotation of the cutting insert 40, illustrates how the fastening member head 50 gradually fits inside and eventually passes through the oval shape of the cross section of the third bore portion 72 (as shown in FIGS. 9-12).

Figure 13:
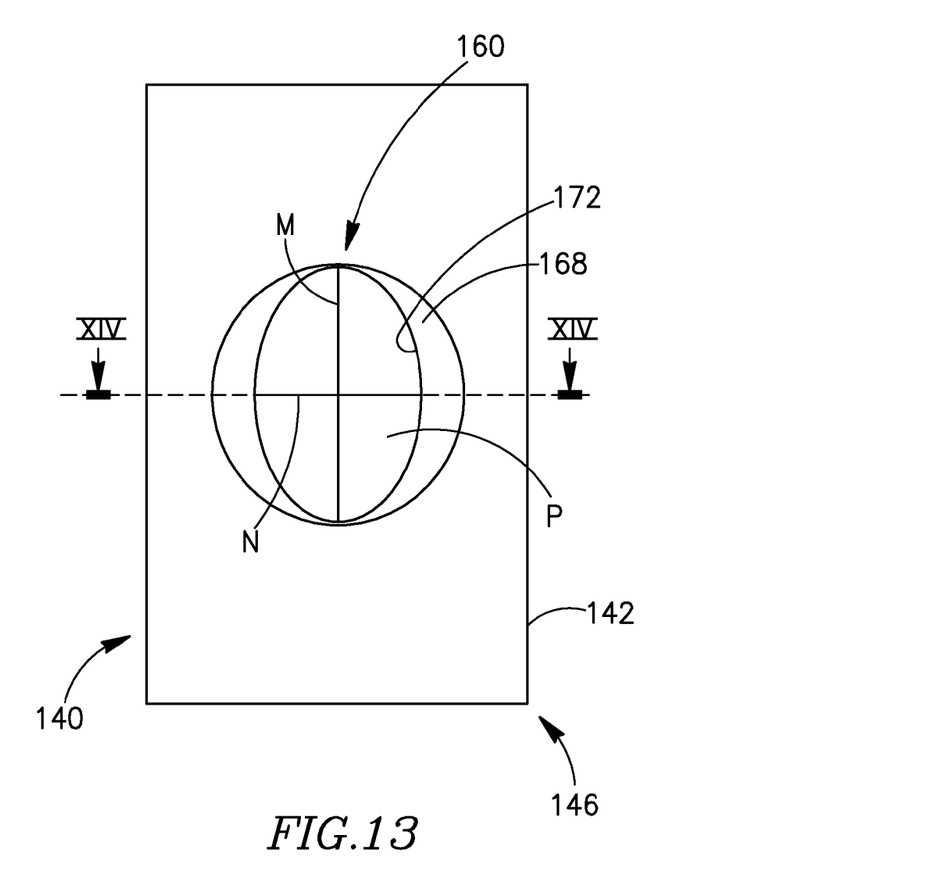
FIG. 13 is a top view of a cutting insert in accordance with a second embodiment of the present invention.
Figure 14:
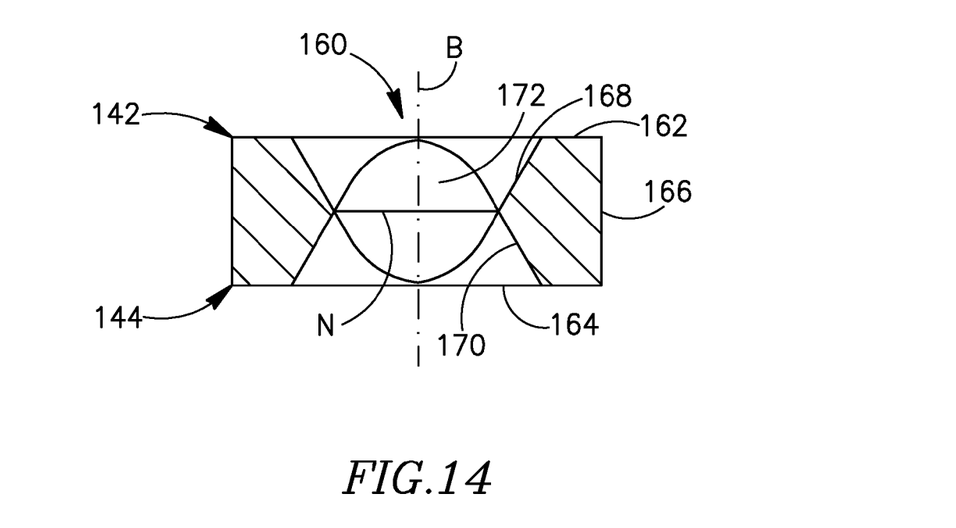
FIG. 14 is a cross-sectional view taken along the line XIV-XIV of FIG. 13.

According to another embodiment, a cutting insert 140 having a cutting insert bore 160 is shown in FIGS. 13 and 14. The cutting insert 140 has first and second peripheral edges 142, 144, respectively, at least a portion of at least one of the first and second peripheral edges 142, 144 forming a cutting edge 146. The cutting insert bore 160 includes first, second and third bore portions 168, 170, 172. The first bore portion opens out to a first surface 162, the second bore portion 170 opens out to a second surface 164 and the third bore portion 172 is located generally between the first and second bore portions 168, 170. In some regions of the cutting insert bore 160, the first and second bore portions 168, 170 come into contact. The third bore portion 172 may have some segments having the same height as a peripheral surface 166 of the cutting insert 140, in which case, the third bore portion partially opens out to at least the first surface 262. Also, if the first and second bore portions 168, 170 are identical, then the cutting insert 140 is a reversible cutting insert.

Figure 15:
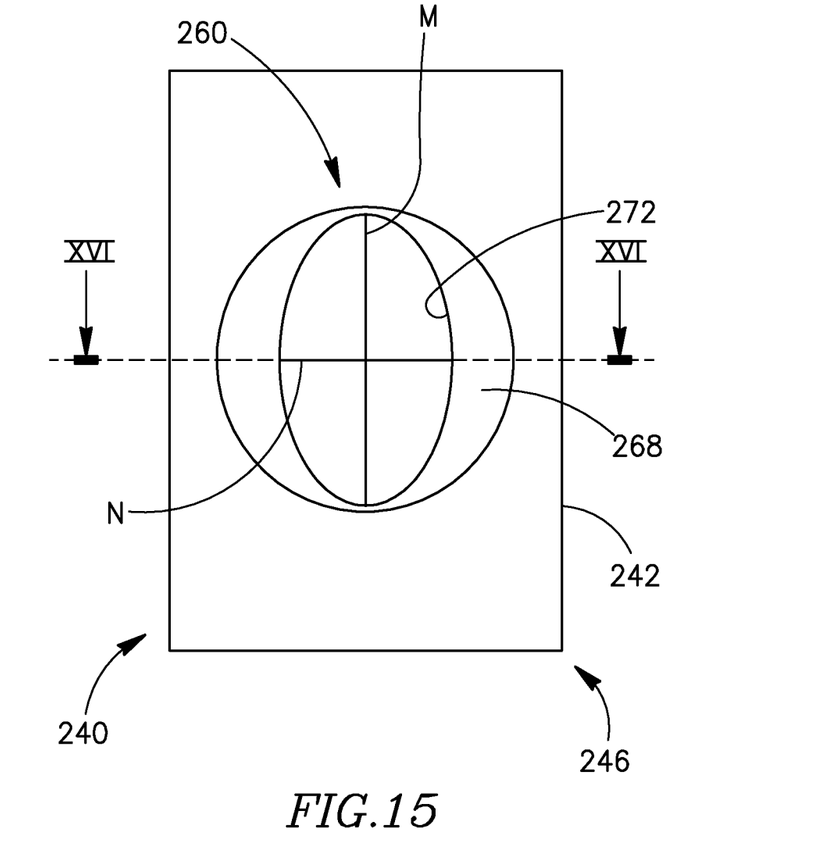
FIG. 15 is a top view of a cutting insert in accordance with a third embodiment of the present invention.
Figure 16:
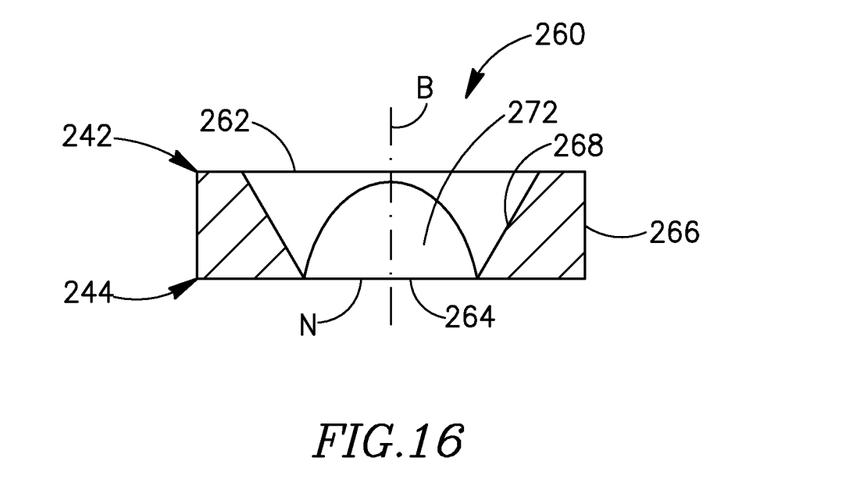
FIG. 16 is a cross-sectional view taken along the line XVI-XVI of FIG. 15.

According to another embodiment shown in FIGS. 15 and 16, a cutting insert 240 has first and second peripheral edges 242, 244, respectively, at least a portion of at least one of the first and second peripheral edges 242, 244 forming a cutting edge 246. The cutting insert 240 has a cutting insert bore 260 with only two bore portions, a first bore portion 268 opening out to a first surface 262 and a second bore portion 272 opening out to a second surface 264 of the cutting insert 240. The second bore portion 272 may also have some segments having the same height as a peripheral surface 266 of the cutting insert 240, in which case, the second bore portion 272 partially opens out to the first surface 262.

Figure 17:
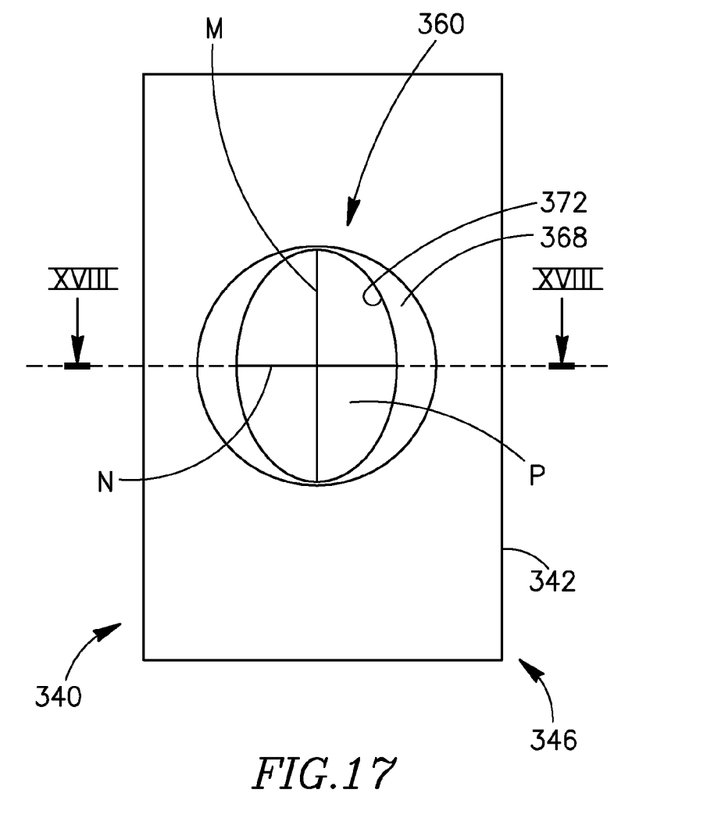
FIG. 17 is a top view of a cutting insert in accordance with a fourth embodiment of the present invention.
Figure 18:
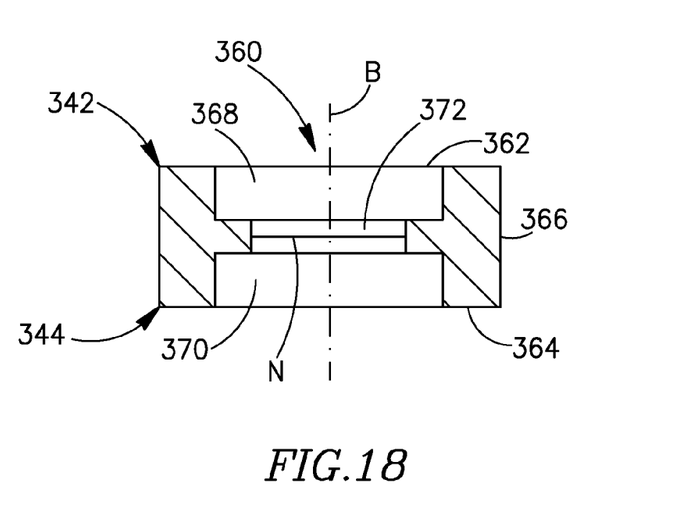
FIG. 18 is a cross-sectional view taken along the line XVIII-XVIII of FIG. 17.

According to yet another embodiment shown in FIGS. 17 and 18, a cutting insert 340 has a peripheral surface, first and second peripheral edges 342, 344, respectively, at least a portion of at least one of the first and second peripheral edges 342, 344 forming a cutting edge 346. The cutting insert 340 has a cutting insert bore 360 having a cylindrical first bore portion 368 opening out to a first surface 362 and a cylindrical second bore portion 370 opening out to a second surface 364. If the first and second cylindrical bore portions 368, 370 are identical, then the cutting insert 340 is a reversible cutting insert.

Figure 19:
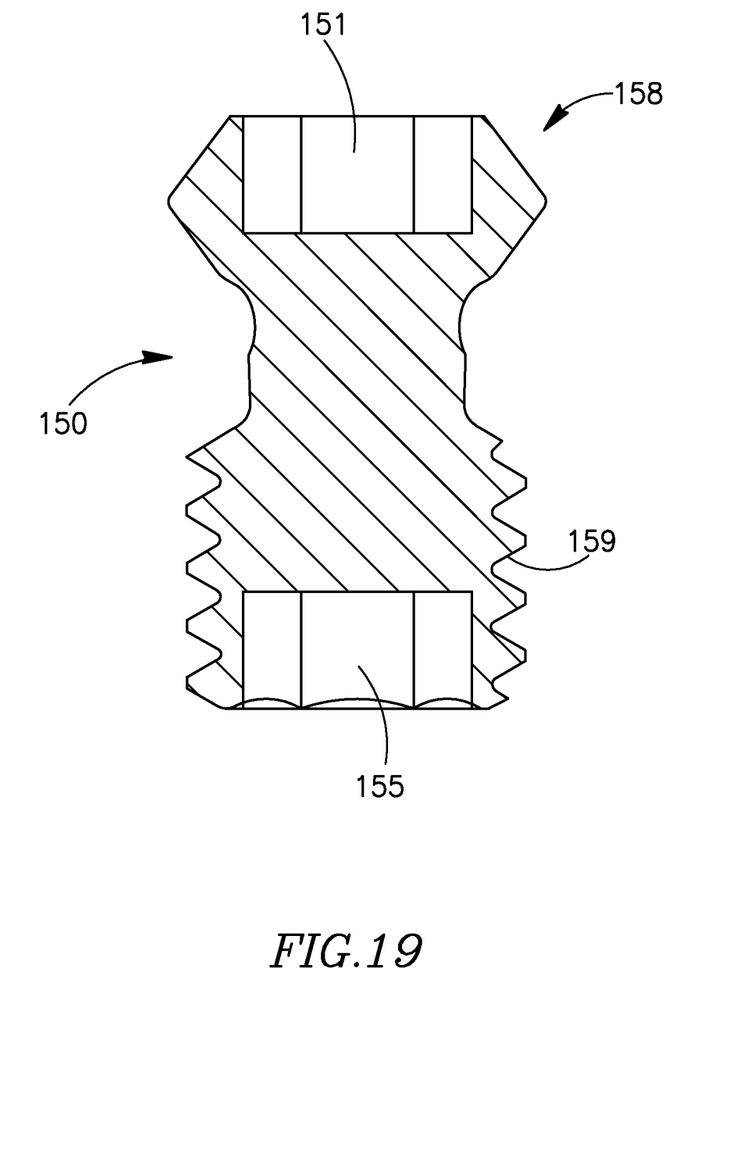
FIG. 19 is a side cross-sectional view of a fastening member according to some embodiments of the present invention.

According to some embodiments as shown in FIG. 19, a fastening member 150 may have, in addition to a first recess 151 in a fastening member head 158 for applying torque to the fastening member 150, a second recess 155 in the coupling portion 159 for applying torque to the fastening member 150. Such an arrangement is particularly useful when approach to the fastening member head 158 is either awkward or impossible. Moreover, since, in accordance with the present invention, the fastening member 150 does not have to be removed, but only loosened, in order to remove and replace a cutting insert, the coupling portion 159 does not have to pass through the cutting insert through bore. Consequently, the coupling portion 159 may have a diameter which is equal to the diameter of the fastening member head 158. This being the case, the second recess 155 may have the same dimensions as the first recess 151 thereby enabling the use of a single torque applying member for both the first and second recess 151, 155.

In accordance with embodiments of the present invention, the cutting insert 140, 340 or the cutting insert bore 160, 360, or both, may be reflection symmetric with respect to the bore plane P defined by the major and minor centerlines M and N.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (40, 140, 340) comprising:
a first surface (62, 162, 362), a second surface (64, 164, 364) and a peripheral surface (66, 166, 366) extending therebetween, the first and second surfaces (62, 162, 362, 64, 164, 364) meeting the peripheral surface (66, 166, 366) at first and second peripheral edges (42, 142, 342, 44, 144, 344), respectively, at least a portion of at least one of the first and second peripheral edges (42, 142, 342, 44, 144, 344) forming a cutting edge (46, 146, 346), and
a cutting insert bore (60, 160, 360) extending between the first and second surfaces and having a bore axis B, the cutting insert bore comprising:
a first bore portion (68, 168, 368) opening out to the first surface (62, 162, 362),
a second bore portion (70, 170, 370) opening out to the second surface (64, 164, 364), and
a third bore portion (72, 172, 372) located between and merging with the first and second bore portions, the third bore portion (72, 172, 372) having a cross-section in a bore plane P which is perpendicular to the bore axis B and spaced from the first and second surfaces, wherein:
the third bore portion has a major centerline M perpendicular to the bore axis B and a minor centerline N perpendicular to the bore axis B defining, respectively, major and minor dimensions $D_M$, $D_N$ of the cross section of the third bore portion (72, 172, 372), and
the cross-section has an oval shape.

2. The cutting insert (140, 340) according to claim 1, wherein:
the bore plane P is defined by the major and minor centerlines M and N; and
the cutting insert (140, 340) is reflection symmetric with respect to the bore plane P.

3. The cutting insert (140, 340) according to claim 1, wherein:
the bore plane P is defined by the major and minor centerlines M and N; and
the cutting insert bore (160, 360) is reflection symmetric with respect to the bore plane P.

4. The cutting insert (340) according to claim 1, wherein the cutting insert bore (360) has a cylindrical first bore portion (368) and a cylindrical second bore portion (370).

5. A cutting insert assembly (22) comprising:
an insert pocket (30) having a pocket base (56) including a pocket bore (54);
a fastening member (50) having a fastening member head (58) and a fastening member coupling portion (59) received in the pocket bore (54); and
a cutting insert (40, 140, 340) comprising:
a first surface (62, 162, 362), a second surface (64, 164, 364) and a peripheral surface (66, 166, 366) extending therebetween, the first and second surfaces (62, 162, 362, 64, 164, 364) meeting the peripheral surface (66, 166, 366) at first and second peripheral edges (42, 142, 342, 44, 144, 344), respectively, at least a portion of at least one of the first and second peripheral edges (42, 142, 342, 44, 144, 344) forming a cutting edge (46, 146, 346), and
a cutting insert bore (60, 160, 360) extending between the first and second surfaces and having a bore axis B, the cutting insert bore comprising:
a first bore portion (68, 168, 368) opening out to the first surface (62, 162, 362),
a second bore portion (70, 170, 370) opening out to the second surface (64, 164, 364), and
a third bore portion (72, 172, 372) located between and merging with the first and second bore portions, the third bore portion (72, 172, 372) having a cross-section in a bore plane P which is perpendicular to the bore axis B and spaced from the first and second surfaces;

wherein:

the cutting insert (40, 140, 340) is transferable between an insert fastened position in which a fastening member head lower portion (80) is in engagement with a first bore abutment surface (69") of the first bore portion, to an insert removal position;

in the insert fastened position, in a top view of the cutting insert (40, 140, 340), the fastening member head (58) has a contour that is too large to pass through the cutting insert bore (60, 160, 360), in the insert removal position, in a top view of the cutting insert (40, 140, 340), the contour of the fastening member head (58) is small enough to pass through the cutting insert bore (60, 160, 360), in the cutting insert bore, the third bore portion has a major centerline M perpendicular to the bore axis B and a minor centerline N perpendicular to the bore axis B defining, respectively, major and minor dimensions $D_M$, $D_N$ of the cross-section of the third bore portion (72, 172, 372), and the cross-section has an oval shape.

6. The cutting insert assembly (22) according to claim 5, wherein the fastening member coupling portion (159) has a diameter which is equal to the diameter of the fastening member head (158).

7. The cutting insert assembly (22) according to claim 6, wherein the fastening member head (158) has a first recess (151) and the coupling portion (159) has a second recess (155) which has the same dimensions as the first recess (151).

8. A method for replacing or indexing a cutting insert secured by a fastening member (50) in an insert pocket (30) of a cutting insert assembly (22) of a cutting tool (10), the insert pocket (30) having a pocket bore (54) and a pocket base (56), the fastening member (50) having a fastening member head (58) and a fastening member coupling portion (59); wherein the cutting insert (40, 140, 340) is in accordance with the cutting insert of claim 1;

the method comprising the steps of:
a) partially removing the fastening member (50) from the pocket bore (54) so that the fastening member coupling portion (59) remains coupled to the pocket bore (54) in a partially coupled position;
b) lifting the cutting insert (40, 140, 340) from the pocket base (56) to a lifted position;
c) rotating the cutting insert (40, 140, 340) about the major centerline M from a starting rotated position, and moving it perpendicularly to the major centerline M to an insert removal position in which, in a top view of the cutting insert, the contour of the fastening member head (58) defines a shape that is small enough to pass through the cutting insert bore; and
d) removing the cutting insert (40, 140, 340) by lifting it off the fastening member head (58).

9. The cutting insert assembly (22) according to claim 5, wherein the bore plane P is defined by the major and minor centerlines M and N; and the cutting insert (140, 340) is reflection symmetric with respect to the bore plane P.

10. A cutting insert assembly (22) comprising:

an insert pocket (30) having a pocket base (56) including a pocket bore (54);

a fastening member (50) having a fastening member head (58) and a fastening member coupling portion (59) received in the pocket bore (54); and a cutting insert (40, 140, 340) comprising:

a first surface (62, 162, 362), a second surface (64, 164, 364) and a peripheral surface (66, 166, 366) extending therebetween, the first and second surfaces (62, 162, 362, 64, 164, 364) meeting the peripheral surface (66, 166, 366) at first and second peripheral edges (42, 142, 342, 44, 144, 344), respectively, at least a portion of at least one of the first and second peripheral edges (42, 142, 342, 44, 144, 344) forming a cutting edge (46, 146, 346), and a cutting insert bore (60, 160, 360) extending between the first and second surfaces and having a bore axis B, the cutting insert bore comprising:

a first bore portion (68, 168, 368) opening out to the first surface (62, 162, 362), a second bore portion (70, 170, 370) opening out to the second surface (64, 164, 364), and a third bore portion (72, 172, 372) located between and merging with the first and second bore portions, the third bore portion (72, 172, 372) having a cross-section in a bore plane which is perpendicular to the bore axis B and spaced from the first and second surfaces;

wherein:

the cutting insert (40, 140, 340) is transferable between an insert fastened position in which a fastening member head lower portion (80) is in engagement with a first bore abutment surface (69") of the first bore portion, to an insert removal position;

in the insert fastened position, in a top view of the cutting insert (40, 140, 340), the fastening member head (58) has a contour that is too large to pass through the cutting insert bore (60, 160, 360), in the insert removal position, in a top view of the cutting insert (40, 140, 340), the contour of the fastening member head (58) is small enough to pass through the cutting insert bore (60, 160, 360), and in the cutting insert bore, the third bore portion has a major centerline M perpendicular to the bore axis B and a minor centerline N perpendicular to the bore axis B defining, respectively, major and minor dimensions $D_M$, $D_N$ of the cross-section of the third bore portion (72, 172, 372).

11. The cutting insert assembly (22) according to claim 10, wherein the bore plane P is defined by the major and minor centerlines M and N; and the cutting insert (140, 340) is reflection symmetric with respect to the bore plane P.

12. The cutting insert assembly (22) according to claim 10, wherein the cross-section has an oval shape.

13. The cutting insert assembly (22) according to claim 12, wherein the oval shape comprises a closed, curved line having a convex shape.

14. The cutting insert assembly (22) according to claim 10, wherein:

the cross-section has an oval shape;

the bore plane P is defined by the major and minor centerlines M and N;

the cutting insert (140, 340) is reflection symmetric with respect to the bore plane P.

15. The cutting insert assembly (22) according to claim 5, wherein the oval shape comprises a closed, curved line having a convex shape.

16. The cutting insert (140, 340) according to claim 1, wherein the oval shape comprises a closed, curved line having a convex shape.

* * * * *